(12) United States Patent
Radford

(10) Patent No.: US 7,014,759 B2
(45) Date of Patent: Mar. 21, 2006

(54) METHOD AND APPARATUS FOR WATER PURIFICATION

(76) Inventor: Thomas K. Radford, 2737 Fairway Knoll Ct., Dacula, GA (US) 30019

( * ) Notice: Subject to any disclaimer, the term of this patent is extended or adjusted under 35 U.S.C. 154(b) by 371 days.

(21) Appl. No.: 09/789,132

(22) Filed: Feb. 20, 2001

(65) Prior Publication Data

US 2002/0092813 A1   Jul. 18, 2002

Related U.S. Application Data

(60) Provisional application No. 60/183,382, filed on Feb. 18, 2000.

(51) Int. Cl.
*B01D 35/027* (2006.01)

(52) U.S. Cl. .................. 210/232; 210/233; 210/282; 210/456; 210/474; 210/475; 222/83.5; 222/185.1; 222/189.06; 222/325; 141/330; 141/364; 141/375

(58) Field of Classification Search ............... 141/375, 141/364, 330; 222/325, 189.06, 185.1, 146.6, 222/83.5; 210/477, 475, 474, 473, 456, 416.3, 210/282, 233, 232
See application file for complete search history.

(56) References Cited

U.S. PATENT DOCUMENTS

| | | | | |
|---|---|---|---|---|
| 4,069,751 A | * | 1/1978 | Gronwick et al. ............ 99/306 |
| 4,597,423 A | * | 7/1986 | Chenot ....................... 141/330 |
| 4,764,274 A | * | 8/1988 | Miller ......................... 210/232 |
| 4,846,236 A | * | 7/1989 | Deruntz ....................... 141/329 |
| 4,995,975 A | * | 2/1991 | Jacquot et al. .............. 210/266 |
| 5,048,723 A | * | 9/1991 | Seymour ...................... 222/81 |
| 5,121,778 A | * | 6/1992 | Baker et al. ................. 141/319 |
| 5,123,555 A | * | 6/1992 | Luch et al. .................. 215/256 |
| 5,280,764 A | * | 1/1994 | Levinrad ..................... 141/330 |
| 5,289,855 A | * | 3/1994 | Baker et al. ................. 141/18 |
| 5,295,519 A | * | 3/1994 | Baker et al. ................. 141/18 |
| 5,297,703 A | * | 3/1994 | Tsao et al. ................... 222/507 |
| 5,472,021 A | * | 12/1995 | Tsao et al. ..................... 141/1 |
| 5,542,555 A | * | 8/1996 | Hidding et al. ............. 215/265 |
| 5,567,322 A | * | 10/1996 | Rundle et al. .............. 210/455 |
| 5,573,047 A | * | 11/1996 | Akin ........................... 141/330 |
| 5,577,393 A | * | 11/1996 | Donselman et al. .......... 62/390 |
| 5,647,416 A | * | 7/1997 | Desrosiers et al. .......... 141/351 |
| 5,676,278 A | * | 10/1997 | Beyer et al. ................ 222/83.5 |
| 5,811,004 A | * | 9/1998 | Robertson et al. .......... 210/482 |
| 5,853,109 A | * | 12/1998 | Elliott .......................... 222/83 |
| 6,029,860 A | * | 2/2000 | Donselman et al. ..... 222/185.1 |
| 6,042,725 A | * | 3/2000 | Serenko et al. ............. 210/266 |
| D426,746 S | * | 6/2000 | Busick et al. ................ D7/398 |
| 6,103,114 A | * | 8/2000 | Tanner et al. ............... 210/232 |
| 6,123,122 A | * | 9/2000 | Dushman .................... 141/348 |
| 6,123,232 A | * | 9/2000 | Donselman et al. ..... 222/185.1 |
| 6,170,386 B1 | * | 1/2001 | Paul ............................. 99/281 |
| 6,283,331 B1 | * | 9/2001 | Lucas .................... 222/153.03 |

(Continued)

*Primary Examiner*—Robert James Popovics
(74) *Attorney, Agent, or Firm*—Thomas, Kayden, Horstemeyer & Risley, L.L.P.

(57) ABSTRACT

The present disclosure relates to a water purification system for use in a water dispensing apparatus. The water purification system comprises an adapter adapted to mount to a top opening of the dispensing unit of the water dispensing apparatus, the adapter including a dispensing unit locking mechanism that is adapted to secure the adapter to the dispensing unit, and a filter connected to the adapter, the filter being adapted to filter impurities from the water that passes through the adapter from the container.

64 Claims, 18 Drawing Sheets

U.S. PATENT DOCUMENTS

D448,974 S * 10/2001 Hydak et al. ................. D7/397
6,619,511 B1 * 9/2003 Hydak et al. ............ 222/185.1
2002/0092813 A1 * 7/2002 Radford ...................... 210/767
2004/0154313 A1 * 8/2004 Taylor et al. ................ 62/3.64

* cited by examiner

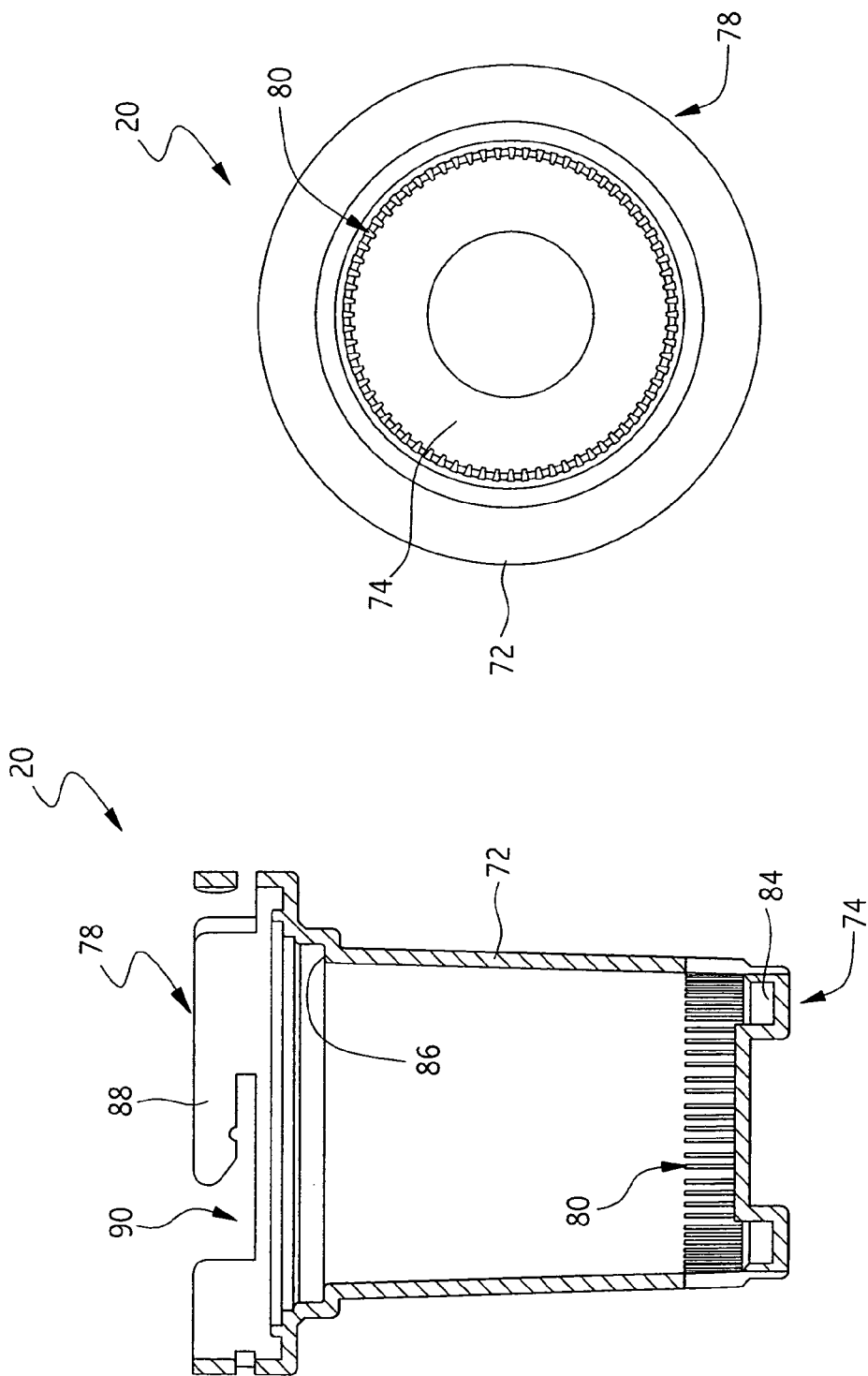

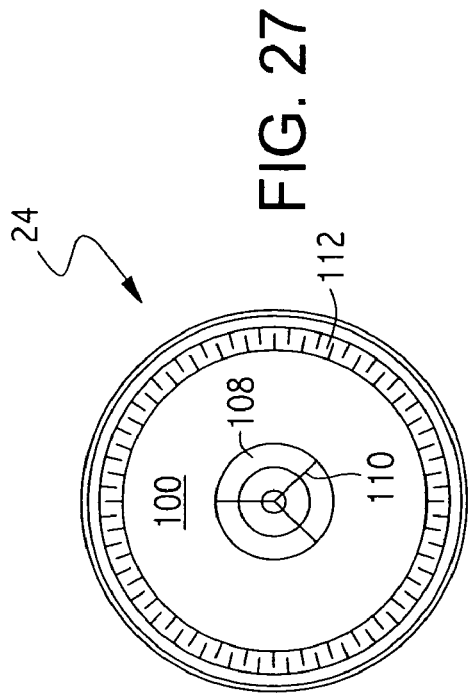
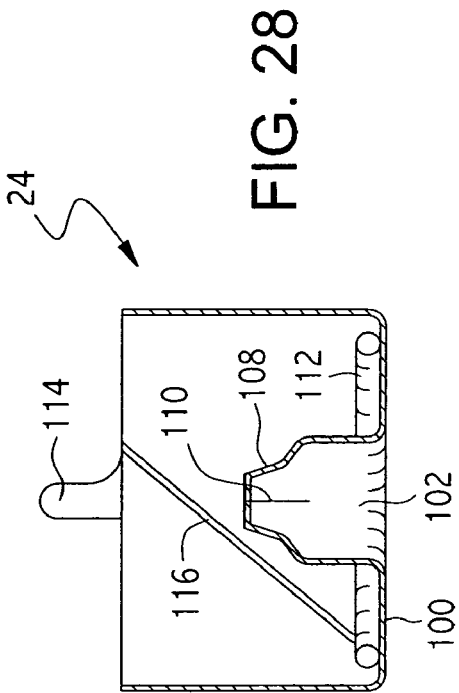
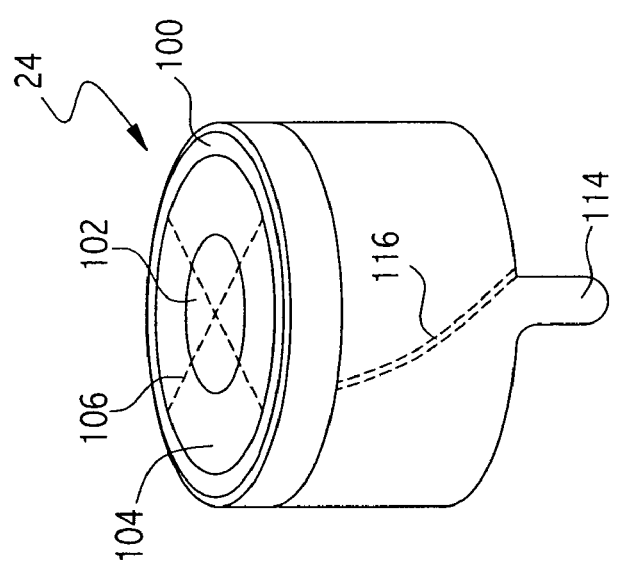

METHOD AND APPARATUS FOR WATER PURIFICATION

CROSS-REFERENCE TO RELATED APPLICATION

This application claims priority to copending U.S. provisional application entitled "METHOD AND APPARATUS FOR WATER PURIFICATION," having Ser. No. 60/183,382, filed Feb. 18, 2000 which is entirely incorporated herein by reference.

FIELD OF THE INVENTION

The present application relates to a method and apparatus for water purification. More particularly, the application relates to a water dispensing apparatus having means for filtering water supplied by a container such as a plastic water bottle so that purified water can be stored for later dispensing.

BACKGROUND OF THE INVENTION

Conventional "water cooler" equipment is well known in the art. Typically, a customer purchases this equipment from a water supplier who regularly supplies the customer with filled containers (e.g., plastic bottles) of fresh water. The containers normally are placed atop a dispensing unit such that water from the container flows into the dispensing unit to fill it. The water stored in the dispensing unit then can be dispensed for drinking or other use by the user through a valve positioned adjacent the bottom portion of the dispensing unit.

There are several disadvantages associated with such conventional systems. One such disadvantage is that the customer is completely dependent upon the water supplier to provide water to refill the dispensing unit. Therefore, if the water is depleted before the scheduled delivery date, the customer can be left without purified drinking water. Although extra water containers can be stored on the customer's premises, these containers typically are large and therefore occupy large amounts of space. It therefore can be appreciated that it would be desirable to have water dispensing apparatus that permits the user have an adequate supply of purified water without being dependent upon water suppliers.

SUMMARY OF THE INVENTION

The present disclosure relates to a water purification system for use in a water dispensing apparatus. The water purification system comprises an adapter adapted to mount to a top opening of the dispensing unit of the water dispensing apparatus, the adapter including a dispensing unit locking mechanism that is adapted to secure the adapter to the dispensing unit, and a filter connected to the adapter, the filter being adapted to filter impurities from the water that passes through the adapter from the container.

In one embodiment, the adapter comprises a flange that is adapted to contact a top opening of a dispensing unit of the dispensing apparatus, a curved throat that extends downwardly from the flange, and a cup-shaped portion connected to the curved throat, the cup-shaped portion including a probe that extends upwardly toward the flange, the probe defining an interior space that is adapted to facilitate the passage of water through the probe, the cup-shaped portion further including a filter locking mechanism that is adapted to securely lock a filter member to the adapter.

In one embodiment, the filter comprises a body portion defining an interior space adapted to receive filtration elements, a top portion provided with a plurality of perforations, a base portion provided with a plurality of perforations, and a locking mechanism adapted to lock the filter to an adapter of the water dispensing apparatus.

When used, the water purification system permits a user to convert regular tap water into purified water without reliance upon a water supplier. The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 19 is a further cross-sectional view of the filter shown in FIGS. 17 and 18.

FIG. 20 is a bottom view of the filter shown in FIGS. 17–19.

FIG. 26 is a perspective view of a cap of the water dispensing apparatus shown in FIGS. 1 and 2.

FIG. 27 is a bottom view of the cap shown in FIG. 26.

FIG. 28 is a cross-sectional view of the cap shown in FIGS. 26 and 27.

DETAILED DESCRIPTION

Figure 1:
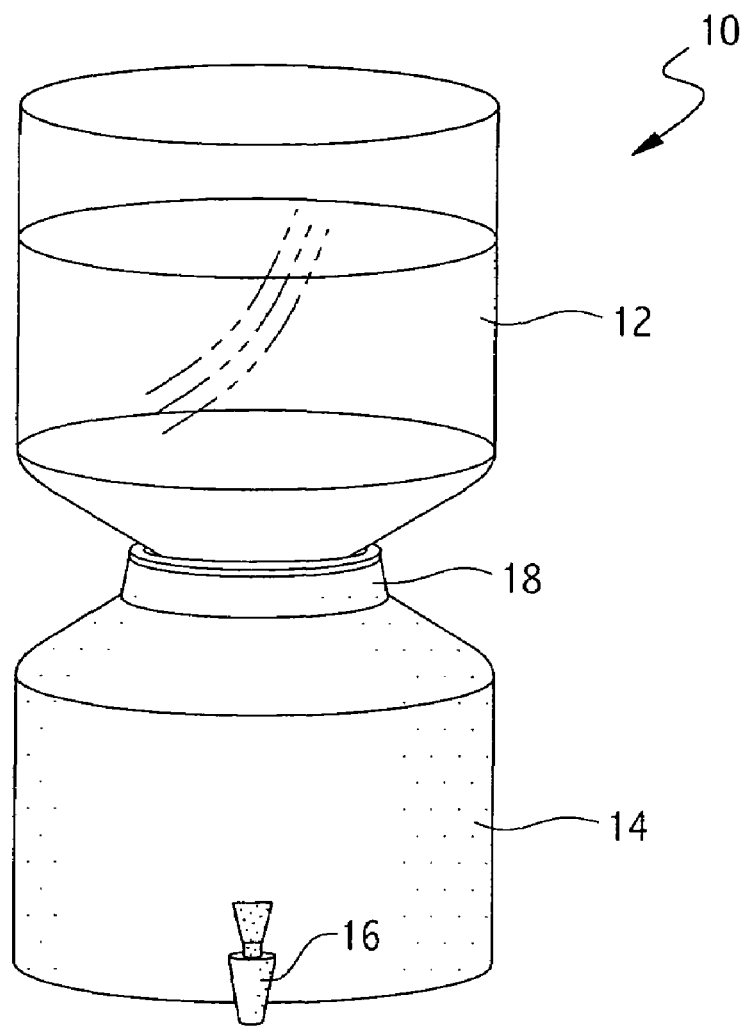
FIG. 1 is a perspective view of a water dispensing apparatus.
Figure 2:
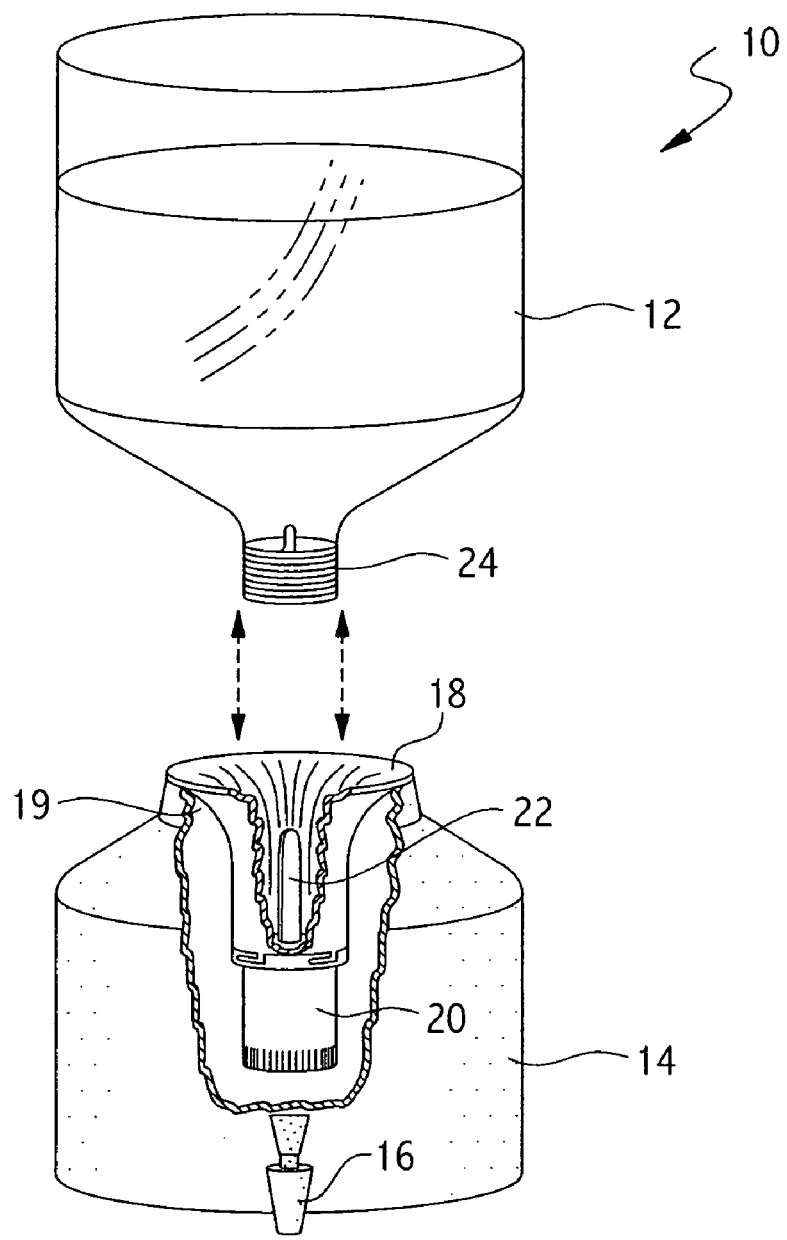
FIG. 2 is a partially exploded, cut-away perspective view of the water dispensing apparatus of FIG. 1.

Referring now in more detail to the drawings, in which like numerals indicate corresponding parts throughout the several views, FIGS. 1 and 2 illustrate an example embodiment of a water dispensing apparatus 10 constructed in accordance with the present invention. As indicated in these figures, the water dispensing apparatus 10 generally comprises a water container 12, such as a conventional plastic water bottle, and a dispensing unit 14, such as a conventional ceramic container. In a preferred embodiment, the container 12 can hold approximately three gallons of water as can the dispensing unit 14. Provided on the dispensing unit 14 adjacent its bottom portion is a dispensing valve 16 from which water contained within the dispensing unit 14 can be dispensed for consumption. Although a single dispersing valve is shown, it is to be understood that the dispensing unit 14 may contain means to cool and/or to heat the water contained therein to a desired temperature prior to dispensing. In such an embodiment, the dispensing unit 14 typically has two or more dispensing valves (not shown) with each dispensing valve adapted to dispense water at a different temperature. Additionally, although particular volumes and materials are identified herein, it is to be appreciated that the water container 12 and dispensing unit 14 may be of various shapes and sizes, and constructed of various materials.

As is indicated most clearly in the partially exploded, cut-away view of FIG. 2, the apparatus 10 further comprises an adapter 18 and a filter 20 that is attached thereto. The adapter 18 fits within a top opening 19 of the dispensing unit 14 so as to be interposed between the water container 12 and the dispensing unit 14. As is further depicted in FIG. 2, the adapter 18 is sized and configured such that it is supported by the edges of the top opening 19 and such that it extends downwardly into the dispensing unit. The adapter 18 comprises a probe 22 that extends upwardly from within the adapter. As is discussed in greater detail hereinafter, the probe 22 is designed to pierce a plastic cap 24, which is positioned over the neck and mouth of the water container 12 prior to its placement atop the dispensing unit 14.

Figure 3:
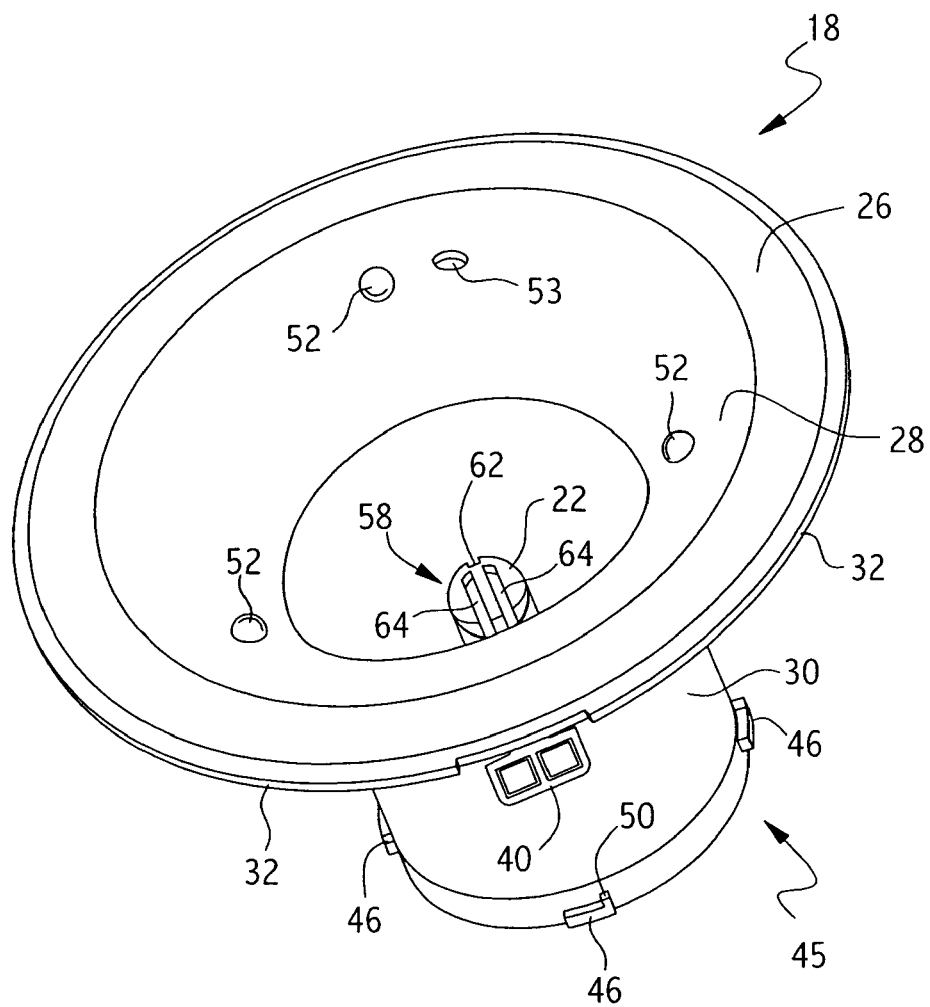
FIG. 3 is a perspective view of an adapter of the water dispensing apparatus of FIGS. 1 and 2.
Figure 4:
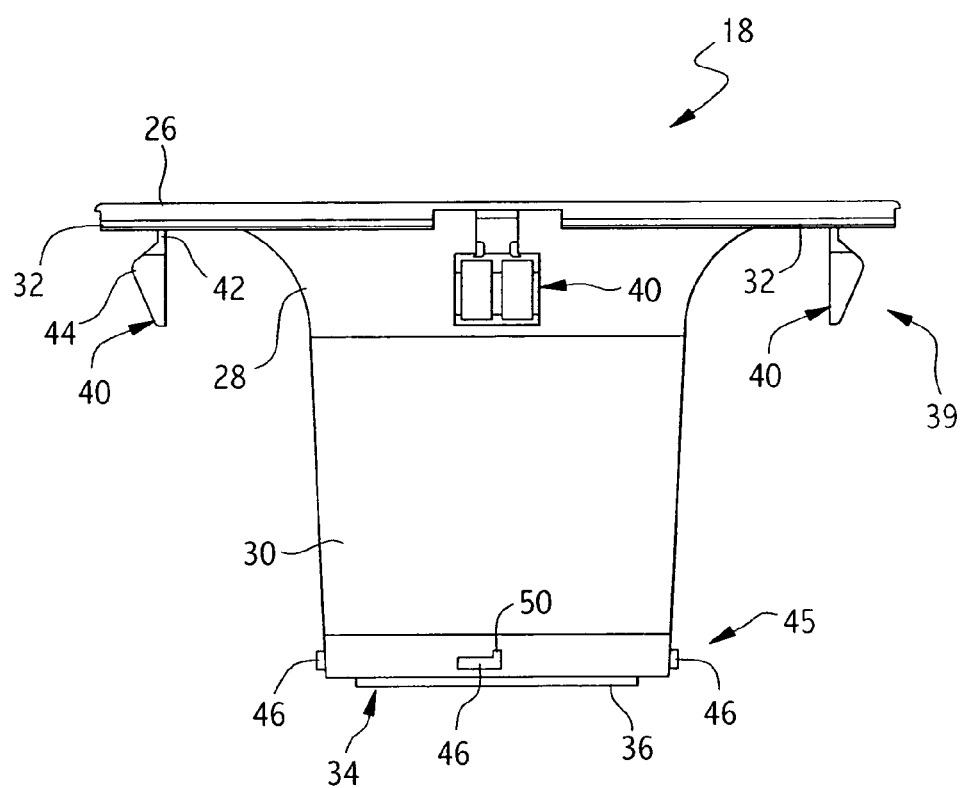
FIG. 4 is a side view of the adapter shown in FIG. 3.
Figure 5:
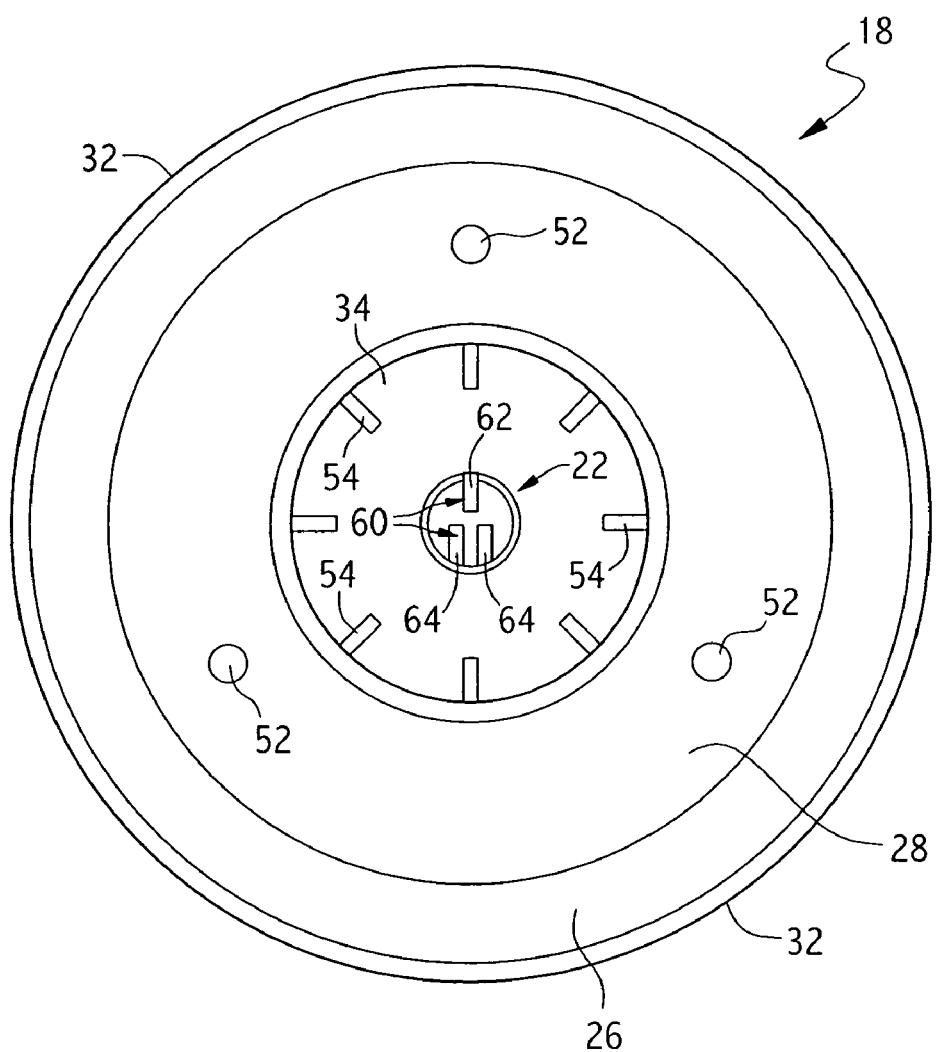
FIG. 5 is a top view of the adapter shown in FIGS. 3 and 4.
Figure 6:
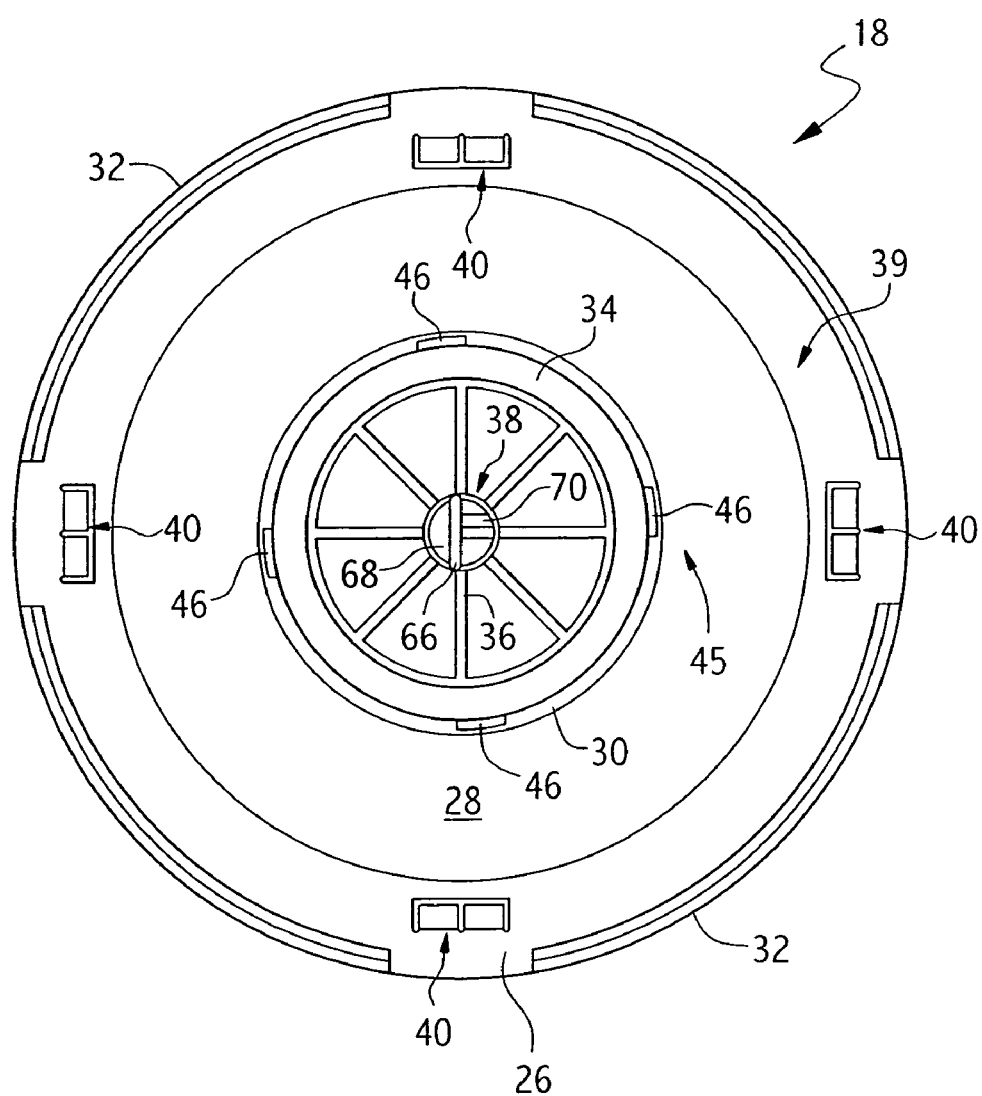
FIG. 6 is a bottom view of the adapter shown in FIGS. 3–5.

FIGS. 3–7 illustrate the adapter 18 in more detail. As shown in FIGS. 3 and 4, the adapter 18 typically is formed unitarily from a single material such as a polymeric material. By way of example, the adapter 18 can be constructed of a polycarbonate material. The adapter 18 typically is substantially funnel-shaped such that the adapter 18 is provided with a flange 26, a curved throat 28, and a cup-shaped portion 30 having substantially vertical walls. As indicated in FIG. 4, the flange 26 includes a peripheral lip 32 that extends downwardly therefrom. This peripheral lip 32 is designed to provide overlap with respect the edges of the top opening 19 of the dispensing unit 14. Formed at the bottom of the cup-shaped portion 30 is a base 34. With reference to FIG. 6, the base 34 can include reinforcement members 36, which serve to strengthen the base. In addition, an opening 38 is provided in the base 34 to provide for the passage of water and air in to and out from the dispensing unit 14.

Referring back to FIGS. 3 and 4, the flange 32 can be provided with a dispensing unit locking mechanism 39 that includes a plurality of locking tabs 40. As indicated in these figures, the locking tabs 40 can extend downwardly from the underside of the flange 32. The locking tabs 40 may be of a variety of shapes and sizes and, in one embodiment, may have a relatively thin flexing portion 42 and a relatively bulbous nodule portion 44. The locking tabs 40 are designed to firmly grasp a lip formed on the dispensing unit 14. In particular, the locking tabs 40 are designed to snap into place with the nodule portions 44 positioned below this lip when the adapter 18 is pushed into place within the dispensing unit 14 by the user. As will be appreciated by persons having ordinary skill in the art, the number, shape, and configuration of the locking tabs 40 may be determined by the particular arrangement of the dispensing unit 14. The locking tabs 40 are typically formed unitarily with the remainder of the adapter 18, although it will be understood that they may be formed separately from the adapter and later securely attached thereto.

Figure 7:
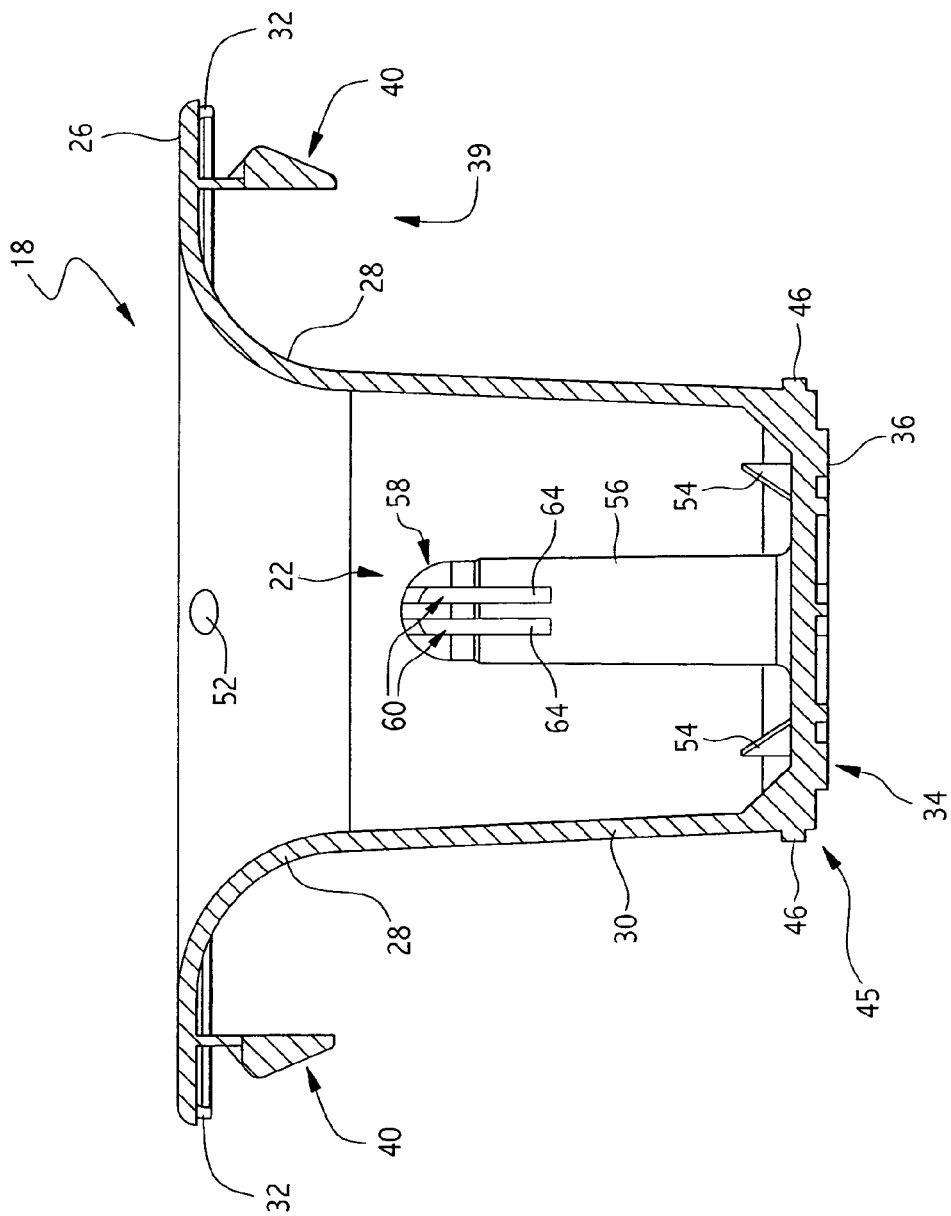
FIG. 7 is a cross-sectional view of the adapter shown in FIGS. 3–6.
Figure 10:
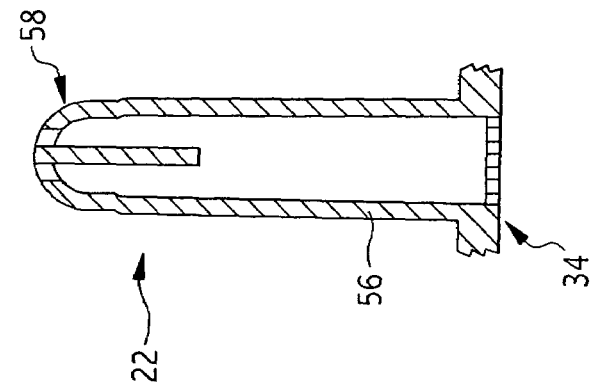
FIG. 10 is a cross-sectional view of the probe shown in FIGS. 8 and 9.
Figure 9:
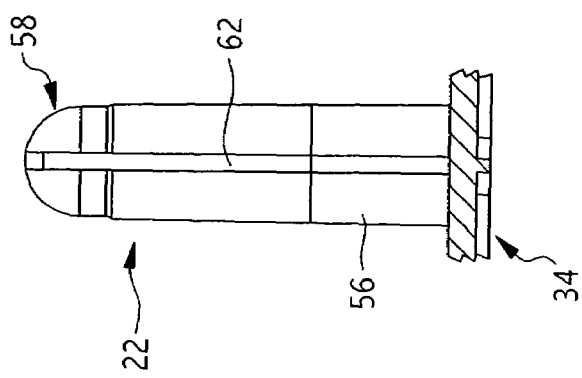
FIG. 9 is a side view of the probe shown in FIG. 8.
Figure 8:
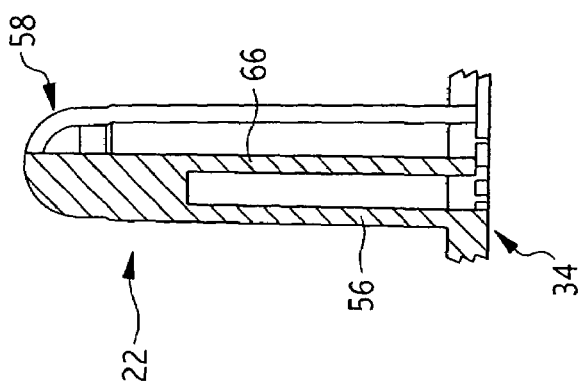
FIG. 8 is a partial cross-sectional view of a probe of the adapter shown in FIGS. 3–7.
Figure 12:
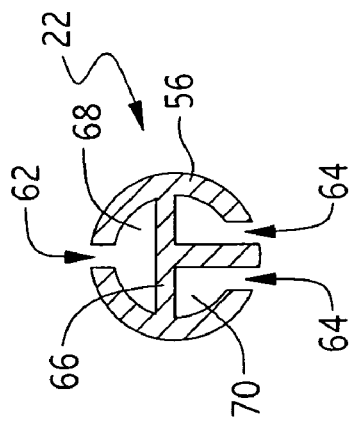
FIG. 12 is a further cross-sectional view of the probe shown in FIGS. 8–11.
Figure 13:
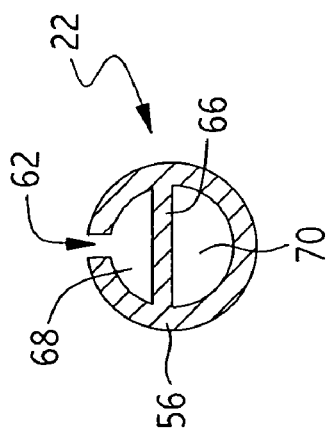
FIG. 13 is a further cross-sectional view of the probe shown in FIGS. 8–11.
Figure 14:
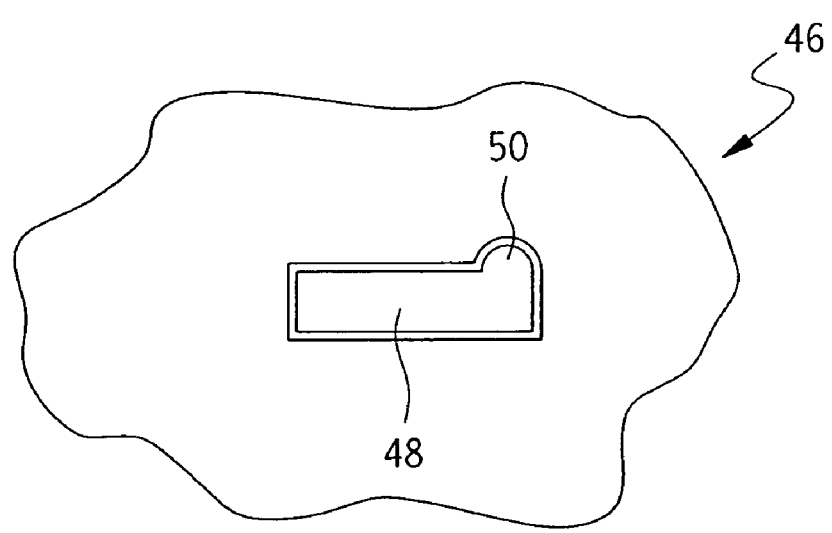
FIG. 14 is a detail view of a locking tab provided on the adapter of FIGS. 3–7.

As is further indicated in FIGS. 3–4 and 6–7, the adapter 18 also includes a filter locking mechanism 45 that, for example, comprises a plurality of locking tabs 46. As is described below, these locking tabs 46 are used to secure the filter 20 to the adapter 18. By way of example, these locking tabs 46 are provided with a horizontal portion 48 as well as a vertical nodule 50 (see FIG. 14) such that the tabs form part of a bayonet-type connection. As shown in FIGS. 3, 5, and 7, the throat 28 may also include a plurality of nodules 52 that are used to properly support the container 12 in position on the adapter 18. In addition, the throat 28 can include a breather hole 53 through which air can pass into the dispensing unit 14 to avoid the creation of a vacuum therein when water is dispensed from the unit.

Figure 11:
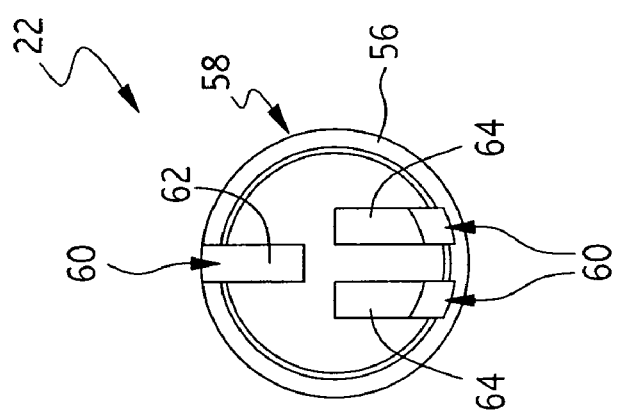
FIG. 11 is a top view of the probe shown in FIGS. 8–10.

Referring now to FIGS. 5–13, the interior of the adapter 18 and the probe 22, will be discussed. As indicated in FIGS. 5 and 7, the adapter 18 can include a plurality of reinforcement members 54 positioned at the junction of the base 34 and the cup-shaped portion 30 that reinforce the base. Adjacent the reinforcement members 54 is the probe 22. As indicated most clearly in FIG. 7, the probe 22 typically extends upwardly from the base 34 of the adapter 18 in a vertical orientation. The probe 22 typically includes an elongated body portion 56 and, in one embodiment, has a substantially circular cross-section. Although a circular cross-section is shown and described, it will be appreciated that other geometric shapes such as a square, rectangle, or triangle may also be suitable. Formed at the end of the body portion 56 is a tip 58 that is designed to pierce the container cap 24. As depicted in FIG. 6, the probe 22 typically includes an interior space that is in fluid communication with a lower opening 38 provided in the base 34 of the adapter 18. In addition, as indicated in FIGS. 5, 7, and 11, the probe 22 is provided with a plurality of upper openings 60. In a preferred embodiment, the openings 60 are arranged as an elongated slot 62 that extends along substantially the entire length of the probe 22, and two relatively short slots 64 that extend along the longitudinal direction of the probe 22. In that preferred embodiment, the relatively short slots 64 are formed on the opposite side from the elongated slot 62 (FIG. 11). As shown most clearly in FIGS. 8 and 12–13, the probe 22 includes a dividing wall 66 that separates the interior space of the probe along substantially is entire length into two separate chambers 68, 70 that are in fluid communication with the elongated slot 62 and the relatively short slots 64, respectively. As is explained below, the first chamber 68 permits the passage of air from the dispensing unit 14 into the container 12 and the second chamber 70 permits the passage of water from the container into the dispensing unit.

Figure 15:
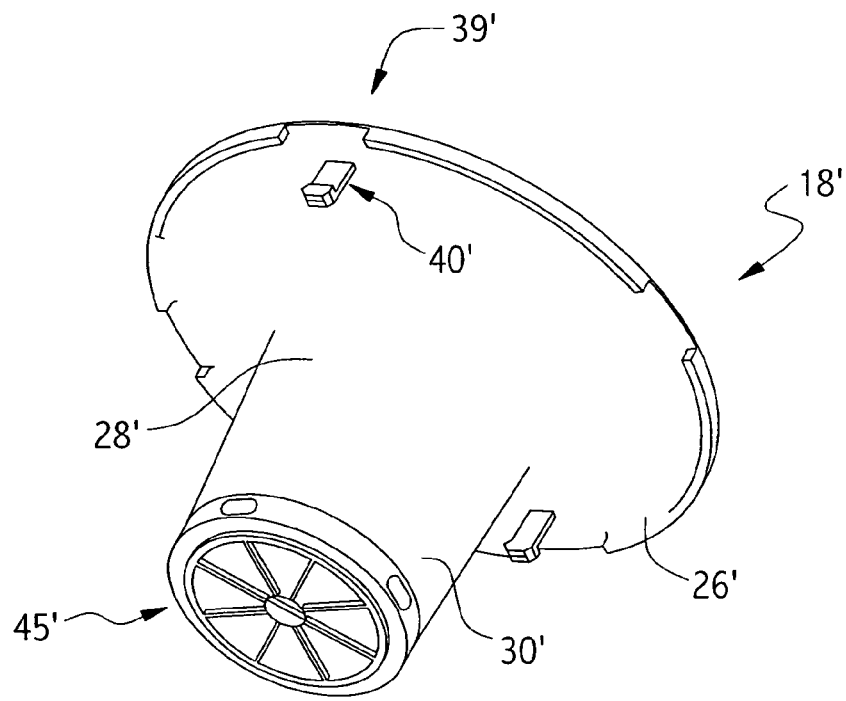
FIG. 15 is a perspective view of an alternative adapter for use with water dispensing apparatus shown in FIG. 1.
Figure 16:
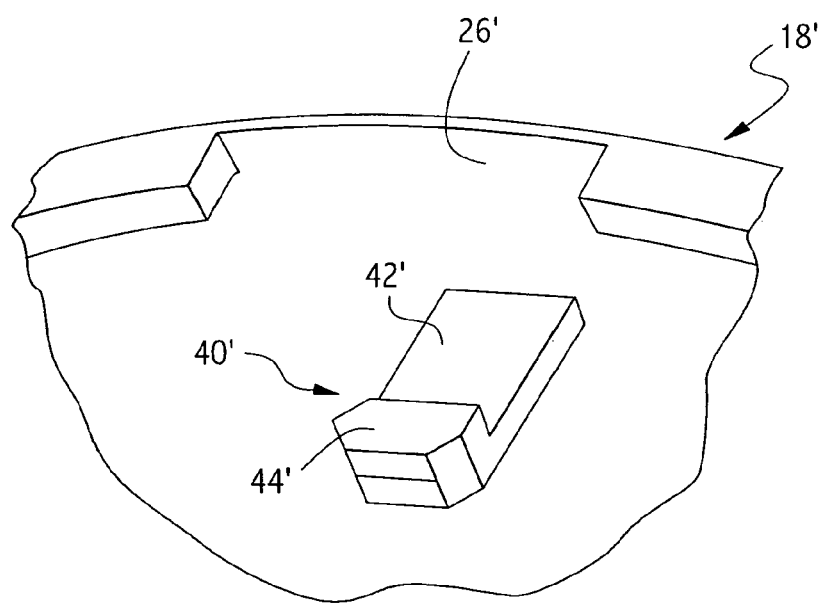
FIG. 16 is a detail view of a locking tab provided on the adapter shown in FIG. 15.

FIGS. 15 and 16 illustrate an alternative embodiment of an adapter 18'. Like the adapter 18, the adapter 18' is substantially funnel-shaped and includes a flange 26', curved throat 28', and a cup-shaped portion 30'. In addition, the adapter 18' includes a dispensing unit locking mechanism 39' and a filter locking mechanism 45'. As indicated in FIGS. 15 and 16, the dispensing unit locking mechanism 39' preferably includes locking tabs 40'. The locking tabs 40' extend downwardly from the underside of the flange 26' and include a relatively thin flexing portion 42' and a relatively thick end portion 44'. As shown in FIG. 16, the end portion 44' can be substantially block-shaped and can extend out from the flexing portion 42' such that the flexing portion and end portion form a substantially L-shaped cross-section. As indicated in FIG. 15, two such locking tabs 40' can be provided in the locking mechanism 39' of the adapter 18'.

Figure 17:
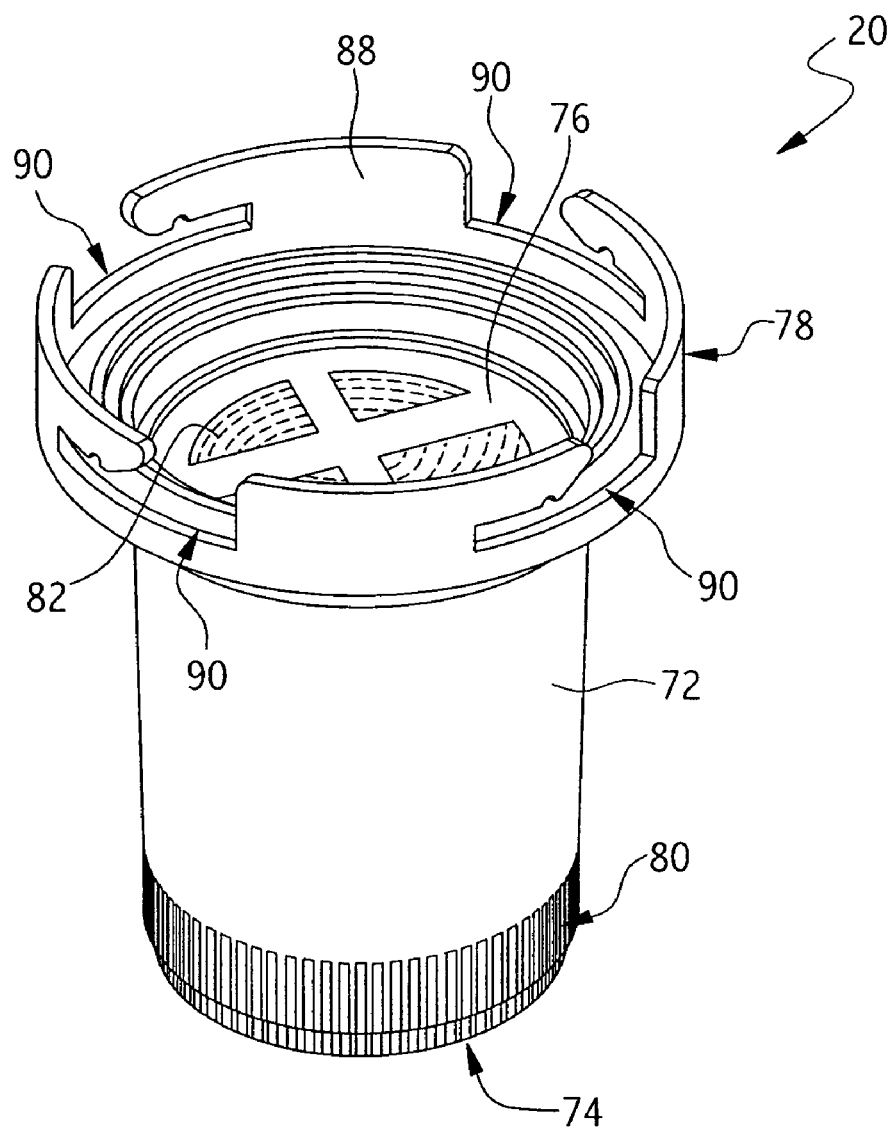
FIG. 17 is a perspective view of a filter of the water dispensing apparatus of FIGS. 1 and 2.

With reference to FIGS. 17–25, the filter 20 will be described. As shown in FIG. 17, the filter 20 comprises a body portion 72, a base 74, an inner cap 76, and a locking mechanism 78. Preferably, as the adapter 18, the body portion 72 is unitarily formed from a single material such as a polymeric material (e.g., polypropylene), however it will be understood that other materials may be used. As indicated in FIG. 17, the body portion 72 can be substantially cylindrical and hollow to provide a container for filtration elements (not shown). Adjacent the base 74 of the filter 20 are a plurality of perforations 80 through which filtered water can pass from the filter into the dispensing unit 14. Preferably, these perforations 80 are formed as elongated slots that are aligned vertically within the filter walls, however other configurations and shapes are possible and would be known to one skilled in the art. The inner cap 76 is similarly provided with a plurality of perforations 82 through which unfiltered water (from the container 12) can enter the filter 20 to be purified. Preferably, these perforations 82 form serpentine passages (FIG. 23) such that water (and any granular material carried thereby) cannot pass directly through the cap 56 but instead must travel a serpentine path through the cap 76. This feature ensures that filtration materials contained within the filter 20 will not flow upwardly into the water container 12.

Figure 18:
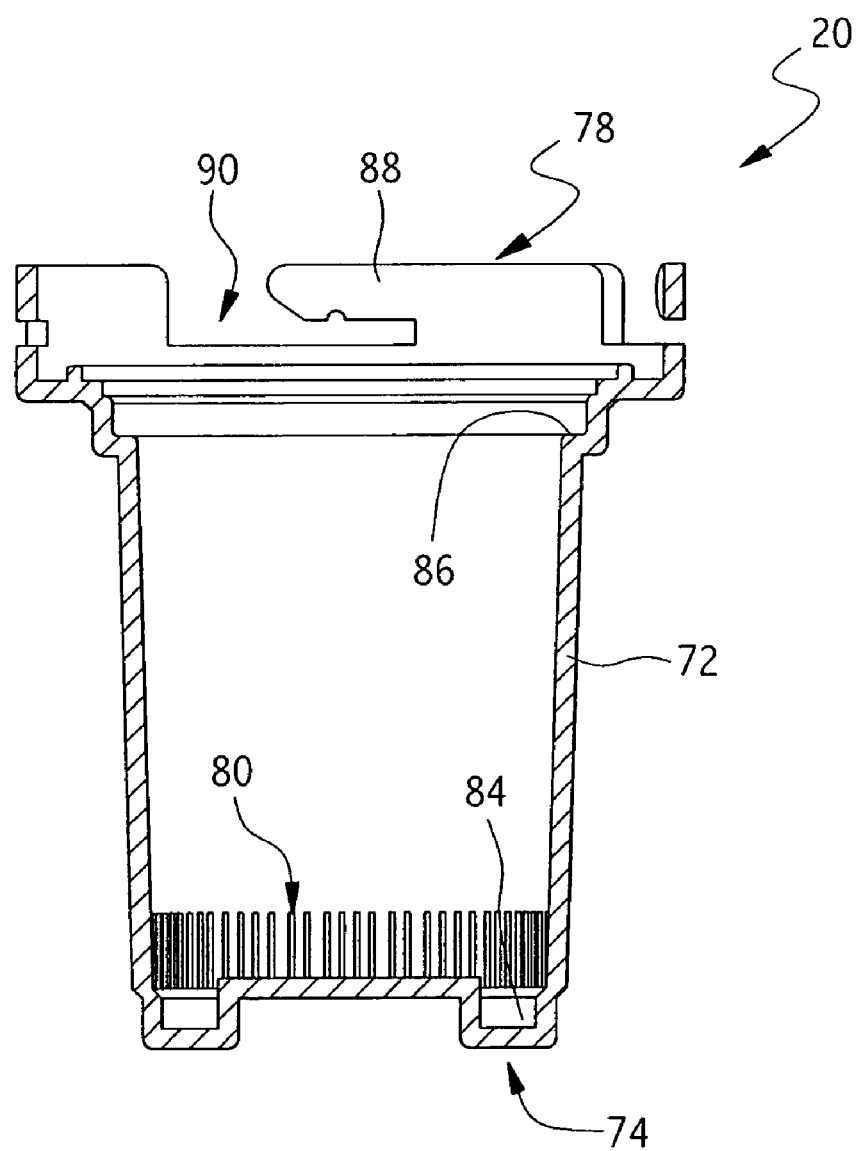
FIG. 18 is a cross-sectional view of the filter shown in FIG. 17.
Figure 21:
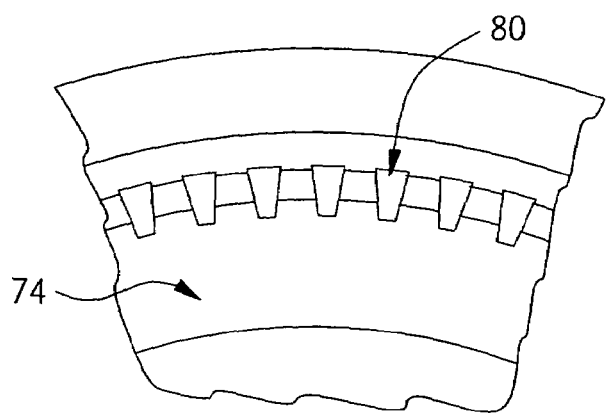
FIG. 21 is a detail view of perforations provided in the filter of FIGS. 17–20.
Figure 22:
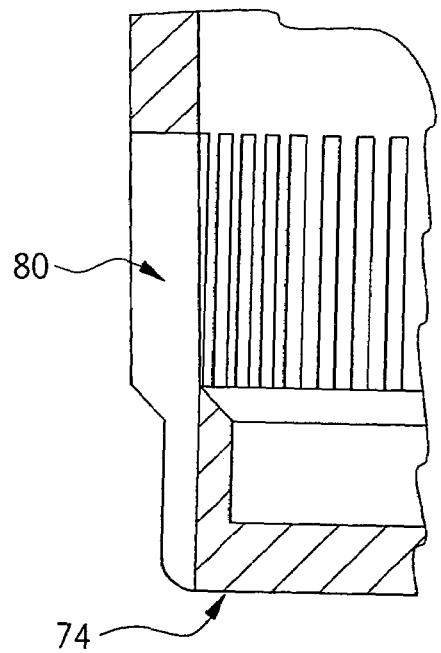
FIG. 22 is a detail view of a single perforation provided in the filter of FIGS. 17–20.
Figure 23:
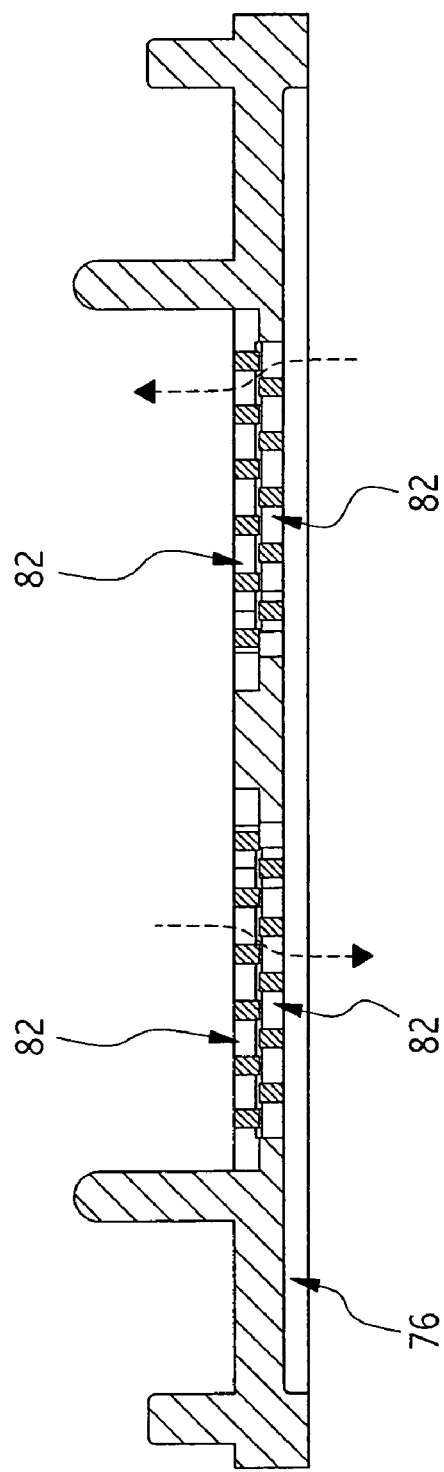
FIG. 23 is a cross-sectional view of a screened cap of the filter member of FIGS. 17–20.
Figure 24:
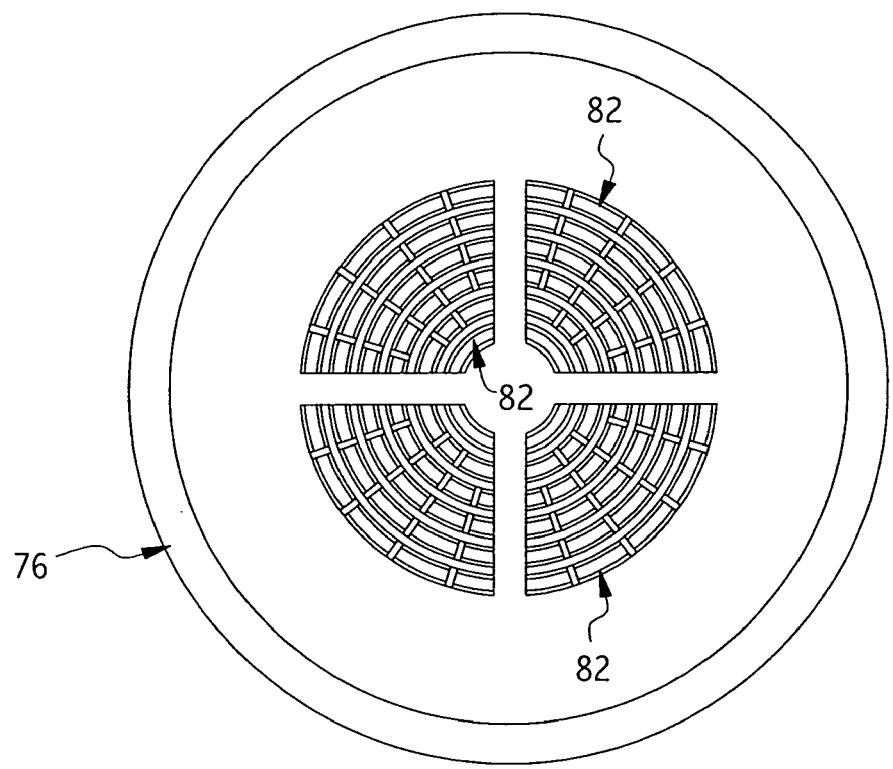
FIG. 24 is a top view of the cap shown in FIG. 23.
Figure 25:
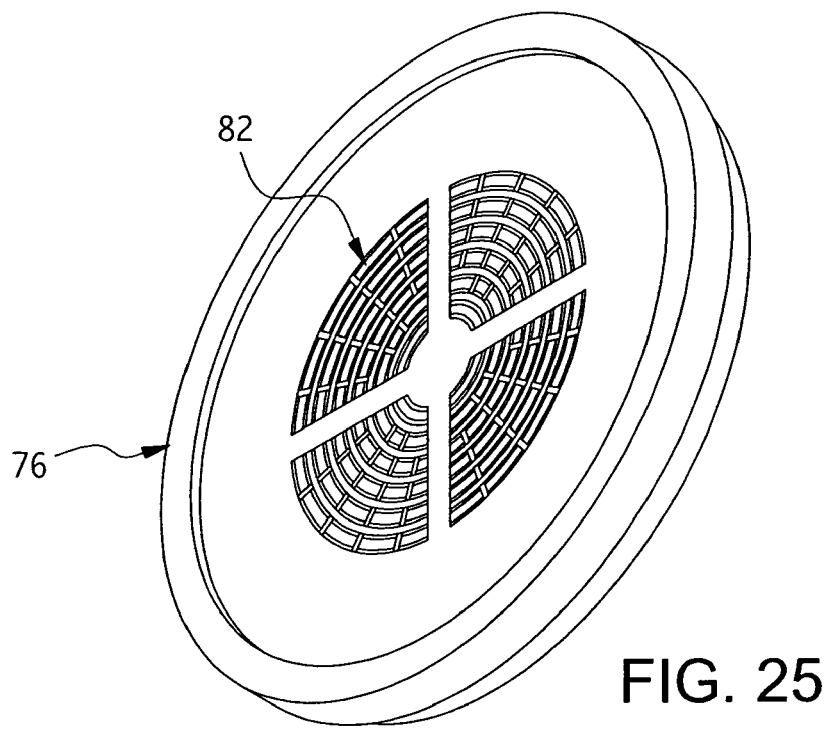
FIG. 25 is a perspective view of the cap shown in FIGS. 24 and 25.

Turning to FIGS. 18 and 19, the filter member 20 is preferably arranged such that a trough 84 is formed in the base 74. In addition, another trough 86 can be formed adjacent the top of the filter 20. Each of the troughs 84, 86 is provided so that adhesive material (not shown), such as melted polypropylene, can be injected therein. This adhesive material holds a fibrous filter insert (not shown) in place within the filter 20 between the base 74 and the cap 76. By way of example, the filter insert can comprise a generally cylindrically-oriented, pleated, one (1) micron filter that is effective in filtering out microorganisms from the water that passes therethrough. When such a filter insert is used, the adhesive material seals the filter insert at its top and bottom such that water passing through the filter must pass through the filter insert prior to exiting the filter 20 through the perforations 80. In addition to the filter insert, the filter 20 can contain a mixture of carbon and an ionized resin which removes bad taste, odors, as well as metals (e.g., lead, copper, zinc) from the water.

As shown in FIGS. 17–19, the locking mechanism 78 is arranged to mate with the locking mechanism 45 or 45' of the adapter 18 or 18' such that the filter 20 connects securely (i.e., snuggly) to the adapter to ensure that water will not pass between the adapter and the filter to circumvent the filtering elements contained within the filter before entering the dispensing unit 14. In a preferred embodiment, the locking mechanism 78 is arranged as a bayonet-type connector that is sized and configured for mating with the locking tabs 46 or 46' of the adapter 18 or 18'. When configured in this manner, the locking mechanism 78 can comprise a peripheral flange 88 that includes with a plurality of slots 90 which are adapted to receive the locking tabs 46 or 46' of the adapter 18 or 18' such that the filter member 20 can be quickly and easily attached and detached therefrom. In particular, the slots 90 include a notch 92 that is adapted to receive the nodule 50 of the locking tabs 46 or 46' (see, e.g. FIG. 16). It is noted that other embodiments for the locking mechanism 78 are feasible.

Preferred embodiments of the apparatus of the present invention having been described in the foregoing, operation of the water dispensing apparatus 10 will be described. First, the user fills the water container 12 with water such as tap water. Once the container 12 is filled to the desired level (e.g., until full), a new cap 24 is placed on the neck and mouth of the container 12 as indicated in FIG. 2. This cap 24 can be conventional in design and configured to prevent water from flowing out of the container as the container is inverted and placed on the dispensing unit 14. Typically, the cap 24 is made of a plastic material and is scored or perforated such that the probe 22 will puncture and/or pierce the cap to open the flow of water from the container 12 to the filter 22.

A preferred embodiment of the cap 24 is shown in FIGS. 26–28. As identified in FIG. 26, the cap 24 is substantially cylindrical and has a base 100. As shown in FIGS. 26 and 28, the base 100 includes an indentation 102 that is adapted to receive the probe 22 of the adapter 18 or 18'. Normally, for sanitation reasons, the indentation 102 is covered with a rupturable membrane 104 (FIG. 26) that, for instance, is provided with score lines 106 that facilitate its rupture. The indentation 102 is formed by a frusto-conical member 108 that is best viewed in FIG. 28. This member 108 is sized and configured to receive the probe 22 and, as identified in FIG. 27, is also provided with score lines 110 that facilitate rupture of the member when the probe is forced therethrough. Preferably, the frusto-conical member 108 is configured to fit securely around the probe 22 to prevent water from leaking out from the cap 24 at the point where the probe punctures the cap. As shown in FIGS. 27 and 28, the cap 24 may also include a sealing ring 112 that surrounds the frusto-conical member 108 inside of the cap 24 which is composed of a flexible material such as rubber or foam. Preferably, the sealing ring 112 is configured to engage the container 12 when the cap 24 is placed on the container to help prevent water from leaking out of the container. In addition, the cap 24 can include a removal tab 114 and an associated score line 116 that facilitate removal of the cap from the container 12 after all water has been distributed from the container.

Once the cap 24 is placed on the container 12, the container is inverted and placed down within the adapter 18 or 18' in the manner indicated in FIG. 2 such that the probe 22 breaks through the membrane 104 and frusto-conical member 108 of the cap. Normally, the weight of the filled container 12 provides enough force for the probe 22 to easily break through the cap 24. Once the container 12 is correctly seated within the adapter 18 or 18', the probe 22 extends within the container and the container is securely held in place. Water then flows from the container 12 through the probe 22 and, in particular, the second chamber 70 of the probe 22, such that the water is passed through the filter member cap 76 and into the filter 20. This water then flows through the filtration materials provided within the filter 20 and eventually flows out from the filter into the dispensing unit 14.

As water flows in this manner, air from within the dispensing unit 14 passes through the probe 22 and into the container 12 so that the creation of a vacuum within the container is avoided. In particular, this air passes through the first chamber 68 of the probe 22. Water continues to flow through the adapter 18 or 18', the filter 20, and into the dispensing unit 14 until the unit is filled and/or the container 12 emptied. Operating in this manner, the apparatus 10 purifies the water supplied by the container 12 and stores it in the dispensing unit 14 for use.

After all of the water has been transferred from the container 12 to the dispensing unit 14, the user may simply remove the empty container 12, remove the used cap 24 (e.g., by pulling on the tab 164), refill the container, and apply a fresh cap 24 thereto. As an individual filter 20 typically is only effective at removing impurities, odors, metals, etc. for a limited period of time, the system 10 preferably includes means for alerting the user to replace the filters. In a preferred embodiment, a predetermined number of caps 24 can be provided to the user along with each new filter 20 such that, when each of the caps has been used with full containers 12 of water, the user will know that it is time to replace the filter 20 when it is time to acquire more caps. Therefore, each filter 20 preferably is sold along with a predetermined number of caps 24 to provide a clear indication when a new filter 20 is required.

While particular embodiments of the invention have been disclosed in detail in the foregoing description and drawings for purposes of example, it will be understood by those skilled in the art that variations and modifications thereof can be made without departing from the spirit and scope of the invention.

What is claimed is:

1. A water purification system for use in a water dispensing apparatus including a water container and a dispensing unit, comprising:
    an adapter adapted to mount to a top opening of the dispensing unit, the adapter including a dispensing unit locking mechanism that is adapted to secure the adapter to the dispensing unit, and a probe that is adapted to extend into the water container when the container is placed atop the adapter;
    a filter connected to the adapter, the filter being adapted to filter impurities from the water that passes through the adapter from the container; and
    wherein the filter has a plurality of perforations at its top and bottom ends, the perforations at the top end forming serpentine paths for water to pass through.

2. The system of claim 1, wherein the adapter is substantially funnel-shaped and is adapted to mount within the top opening of the dispensing unit.

3. The system of claim 1, wherein the dispensing unit locking mechanism comprises at least one locking tab adapted to clamp about the top opening of the dispensing unit.

4. The system of claim 1, wherein the adapter comprises a base and wherein the probe extends upwardly from the base.

5. The system of claim 1, wherein the probe defines an interior space that is divided into separate chambers by an internal dividing wall.

6. The system of claim 5, wherein the chambers are each in fluid communication with an opening at a base of the probe and an opening at a top of the probe.

7. The system of claim 6, wherein the openings at the top of the probe are slots that extend along a longitudinal direction of the probe.

8. The system of claim 1, wherein the adapter further comprises a filter locking mechanism that facilitates connection of the filter to the adapter.

9. The system of claim 8, wherein the filter locking mechanism comprises a plurality of locking tabs.

10. The system of claim 8, wherein the filter comprises a locking mechanism that is configured to mate with the filter locking mechanism of the adapter such that the filter is releasably attachable to the adapter.

11. The system of claim 10, wherein the locking mechanism of the filter comprises a flange and a plurality of slots that are provided in the flange.

12. A water dispensing apparatus, comprising:
    a water container adapted to hold a quantity of water;
    a dispensing unit having a top opening;
    an adapter that mounts within the top opening of the dispensing unit and supports the water container within the top opening, the adapter including a dispensing unit locking mechanism that secures the adapter to the dispensing unit, the dispensing unit locking mechanism including at least one locking tab that clamps about the top opening of the dispensing unit;
    a filter connected to the adapter, the filter being adapted to filter impurities from the water that passes through the adapter from the container;
    wherein the adapter comprises a base and a probe that extends upwardly from the base; and
    wherein the probe defines an interior space that is divided into separate chambers by an internal dividing wall.

13. The apparatus of claim 12, wherein the adapter is substantially funnel-shaped and is adapted to mount within the top opening of the dispensing unit.

14. The apparatus of claim 12, wherein the adapter further comprises a probe that is extends into the water container when the container is placed atop the adapter.

15. The apparatus of claim 12, wherein the chambers are each in fluid communication with an opening at a base of the probe and an opening at a top of the probe.

16. The apparatus of claim 15, wherein the openings at the top of the probe are slots that extend along a longitudinal direction of the probe.

17. The apparatus of claim 12, wherein the adapter further comprises a filter locking mechanism that facilitates connection of the filter to the adapter.

18. The apparatus of claim 17, wherein the filter locking mechanism comprises a plurality of locking tabs.

19. The apparatus of claim 17, wherein the filter comprises a locking mechanism that is configured to mate with the filter locking mechanism of the adapter such that the filter is releasably attachable to the adapter.

20. The apparatus of claim 19, wherein the locking mechanism of the filter comprises a flange and a plurality of slots that are provided in the flange.

21. A water dispensing apparatus, comprising:
    a water container adapted to hold a quantity of water;
    a dispensing unit having a top opening;
    an adapter that mounts within the top opening of the dispensing unit and supports the water container within the top opening, the adapter including a dispensing unit locking mechanism that secures the adapter to the dispensing unit, the dispensing unit locking mechanism including at least one locking tab that clamps about the top opening of the dispensing unit;
    a filter connected to the adapter, the filter being adapted to filter impurities from the water that passes through the adapter from the container; and wherein the filter has a plurality of perforations at its top and bottom ends, the perforations at the top end forming serpentine paths for water to pass through.

22. A water purification system for use in a water dispensing apparatus including a water container and a dispensing unit, comprising:
an adapter adapted to mount to a top opening of the dispensing unit, the adapter including a dispensing unit locking mechanism that is adapted to secure the adapter to the dispensing unit, the dispensing unit locking mechanism including at least one locking tab adapted to clamp about the top opening of the dispensing unit;
a filter connected to the adapter, the filter being adapted to filter impurities from the water that passes through the adapter from the container; and
wherein the filter has a plurality of perforations at its top and bottom ends, the perforations at the top end forming serpentine paths for water to pass through.

23. The system of claim 22, wherein the adapter is substantially funnel-shaped and is adapted to mount within the top opening of the dispensing unit.

24. The system of claim 22, wherein the adapter further comprises a base and a probe extending upwardly from the base.

25. The system of claim 22, wherein the adapter comprises a filter locking mechanism that facilitates connection of the filter to the adapter.

26. The system of claim 25, wherein the filter locking mechanism comprises a plurality of locking tabs.

27. The system of claim 25, wherein the filter comprises a locking mechanism that is configured to mate with the filter locking mechanism of the adapter such that the filter is releasably attachable to the adapter.

28. The system of claim 27, wherein the locking mechanism of the filter comprises a flange and a plurality of slots that are provided in the flange.

29. A water purification system for use in a water dispensing apparatus including a water container and a dispensing unit, comprising:
an adapter adapted to mount to a top opening of the dispensing unit, the adapter including a dispensing unit locking mechanism that is adapted to secure the adapter to the dispensing unit, the dispensing unit locking mechanism including at least one locking tab adapted to clamp about the top opening of the dispensing unit;
a filter connected to the adapter, the filter being adapted to filter impurities from the water that passes through the adapter from the container;
wherein the adapter further comprises a base and a probe extending upwardly from the base; and
wherein the probe defines an interior space that is divided into separate chambers by an internal dividing wall.

30. The system of claim 29, wherein the chambers are each in fluid communication with an opening at a base of the probe and an opening at a top of the probe.

31. The system of claim 30, wherein the openings at the top of the probe are slots that extend along a longitudinal direction of the probe.

32. A water purification system for use in a water dispensing apparatus including a water container and a dispensing unit, comprising:
an adapter adapted to mount to a top opening of the dispensing unit, the adapter including a dispensing unit locking mechanism that is adapted to secure the adapter to the dispensing unit, a filter locking mechanism that facilitates connection of a filter to the adapter, and a locking mechanism that is configured to mate with the filter locking mechanism such that the filter is releasably attachable to the adapter;
a filter connected to the adapter, the filter being adapted to filter impurities from the water that passes through the adapter from the container; and
wherein the filter has a plurality of perforations at its top and bottom ends, the perforations at the top end forming serpentine paths for water to pass through.

33. The system of claim 32, wherein the adapter is substantially funnel-shaped and is adapted to mount within the top opening of the dispensing unit.

34. The system of claim 33, wherein the adapter further comprises a base and a probe extending upwardly from the base.

35. The system of claim 34, wherein the probe defines an interior space that is divided into separate chambers by an internal dividing wall.

36. The system of claim 35, wherein the chambers are each in fluid communication with an opening at a base of the probe and an opening at a top of the probe.

37. The system of claim 36, wherein the openings at the top of the probe are slots that extend along a longitudinal direction of the probe.

38. The system of claim 32, wherein the adapter comprises a filter locking mechanism comprising a plurality of locking tabs.

39. The system of claim 32, wherein the filter comprises a locking mechanism that comprises a flange and a plurality of slots that are provided in the flange.

40. A water purification system for use in a water dispensing apparatus including a water container and a dispensing unit, comprising:
an adapter adapted to mount to a top opening of the dispensing unit, the adapter including a dispensing unit locking mechanism that is adapted to secure the adapter to the dispensing unit; and
a filter connected to the adapter, the filter being adapted to filter impurities from the water that passes through the adapter from the container, the filer including a plurality of perforations at its top and bottom ends, the perforations at the top end forming serpentine paths for water to pass through.

41. The system of claim 40, wherein the adapter is substantially funnel-shaped and is adapted to mount within the top opening of the dispensing unit.

42. The system of claim 40, wherein the adapter comprises a base and a probe extending upwardly from the base.

43. The system of claim 42, wherein the probe defines an interior space that is divided into separate chambers by an internal dividing wall.

44. The system of claim 43, wherein the chambers are each in fluid communication with an opening at a base of the probe and an opening at a top of the probe.

45. The system of claim 44, wherein the openings at the top of the probe are slots that extend along a longitudinal direction of the probe.

46. The system of claim 40, wherein the adapter comprises a filter locking mechanism comprising a plurality of locking tabs.

47. The system of claim 40, wherein the filter comprises a locking mechanism that comprises a flange and a plurality of slots that are provided in the flange.

48. A water purification system for use in a water dispensing apparatus including a water container and a dispensing unit, comprising:
an adapter adapted to mount to a top opening of the dispensing unit, the adapter including a dispensing unit locking mechanism that is adapted to secure the adapter to the dispensing unit and a probe that extends into the water container when the container is placed atop the adapter;

a filter connected to the adapter, the filter being adapted to filter impurities from the water that passes through the adapter from the container; and wherein the filter has a plurality of perforations at its top and bottom ends, the perforations at the top end forming serpentine paths for water to pass through.

49. The apparatus of claim 48, wherein the adapter is substantially funnel-shaped and is adapted to mount within the top opening of the dispensing unit.

50. The apparatus of claim 48, wherein the adapter further comprises a base and wherein the probe extends upwardly from the base.

51. The apparatus of claim 50, wherein the probe defines an interior space that is divided into separate chambers by an internal dividing wall.

52. The apparatus of claim 51, wherein the chambers are each in fluid communication with an opening at a base of the probe and an opening at a top of the probe.

53. The apparatus of claim 52, wherein the openings at the top of the probe are slots that extend along a longitudinal direction of the probe.

54. The apparatus of claim 48, wherein the adapter comprises a filter locking mechanism that facilitates connection of the filter to the adapter.

55. The apparatus of claim 54, wherein the filter locking mechanism comprises a plurality of locking tabs.

56. The apparatus of claim 54, wherein the filter comprises a locking mechanism that is configured to mate with the filter locking mechanism of the adapter such that the filter is releasably attachable to the adapter.

57. The apparatus of claim 56, wherein the locking mechanism of the filter comprises a flange and a plurality of slots that are provided in the flange.

58. A water dispensing apparatus, comprising:

a water container adapted to hold a quantity of water;

a dispensing unit having a top opening;

an adapter that mounts within the top opening of the dispensing unit and supports the water container within the top opening, the adapter including a dispensing unit locking mechanism that secures the adapter to the dispensing unit; and a filter connected to the adapter, the filter being adapted to filter impurities from the water that passes through the adapter from the container, wherein the filter has a plurality of perforations at its top and bottom ends, the perforations at the top end forming serpentine paths for water to pass through.

59. The apparatus of claim 58, wherein the adapter is substantially funnel-shaped and is adapted to mount within the top opening of the dispensing unit.

60. The apparatus of claim 58, wherein the adapter further comprises a base and a probe extending upwardly from the base.

61. The apparatus of claim 60, wherein the probe defines an interior space that is divided into separate chambers by an internal dividing wall.

62. The apparatus of claim 61, wherein the chambers are each in fluid communication with an opening at a base of the probe and an opening at a top of the probe.

63. The apparatus of claim 62, wherein the openings at the top of the probe are slots that extend along a longitudinal direction of the probe.

64. The apparatus of claim 58, wherein the filter further comprises a locking mechanism comprising flange and a plurality of slots that are provided in the flange.

* * * * *